United States Patent Office 3,792,148
Patented Feb. 12, 1974

3,792,148
PROCESS FOR THE PREPARATION OF SHAPED ARTICLES FROM POLYAMIDES
Eckart Reske, Hofheim, Taunus, Ludwig Brinkmann, Frankfurt am Main, and Harald Cherdron, Naurod, Taunus, Germany, assignors to Farbwerke Hoechst Aktiengesellschaft vormals Meister Lucius & Bruning, Frankfurt am Main, Germany
No Drawing. Filed Apr. 14, 1972, Ser. No. 244,281
Claims priority, application Germany, Apr. 16, 1971, P 21 18 510.4
Int. Cl. B29c 25/00
U.S. Cl. 264—331                                6 Claims

ABSTRACT OF THE DISCLOSURE

There is disclosed and claimed a process for the production of shaped articles from polyamides which exhibit melting ranges near to or above their decomposition temperatures or poor or no solubility at all in solvents or which exhibit both of these properties at the same time, the process which comprises moulding polyamides carrying substituents of the amide nitrogen and thus having reduced melting ranges and/or improved solubility in solvents, and separating (splitting-off) said substituents partially or totally during and/or after moulding.

---

The present invention relates to a process for the production of shaped articles from polyamides.

Numerous polyamides which, in principle, can be prepared according to known methods have acquired only little or no practical importance, despite their great thermal stability, since their processing was hitherto impossible or at most very difficult to realize. Their melting ranges come, in fact, near to or are above their decomposition temperatures. On the other hand, these polyamides are mostly insoluble in solvents which would allow for a processing into fibers, sheets etc.

It is known that the intermolecular forces which are responsible for the high melting points and consequently for the insolubility can be reduced by introducing substituents into the polyamide chains, particularly at the amide nitrogen, in order to reduce the melting range and to increase the solubility of the polyamide.

However, with an increase of the number of substituents, some mechanical properties of the polyamides will decrease, so that they cannot be employed for the manufacture of, for example gear wheels, bearings, and various other technical parts requiring hardness, wear resistance, heat resistance and stability towards solvents.

Now, a process has been found for the production of shaped articles from polyamides which are high-melting or which are sparingly soluble or which do not dissolve at all in solvents, or which show these properties at the same time, which comprises moulding polyamides which are substituted at the amide nitrogen from the melt or from a solution and separating (splitting-off) the substituents partially or totally during moulding, after moulding or during and after moulding of the polyamides.

In the process according to the invention, polyamides are used which are partially or totally substituted at the amide nitrogen.

Aliphatic or aromatic-aliphatic hydrocarbon radicals, particularly alkyl or cyclo-alkyl groups having 2 to 12, preferably 2 to 8 carbon atoms, and aralkyl groups having 7 to 20 carbon atoms, preferably 7 to 12 carbon atoms, which can be thermally split off as unsaturated hydrocarbons, are suitable substituents for the amide hydrogen. Particularly advantageous are the n- and i-propyl and the i- and tertiary butyl groups. Mixtures of two or more of the above alkyl-, cycloalkyl-, and aralkyl groups may also serve as substituents.

Generally, it is necessary to use polyamides in which at least 10% of the amide hydrogen is replaced by substituents in order to sufficiently decrease the melting range or to increase the solubility of the polyamides, a substitution degree of from 50 to 100% being preferred.

For the preparation of the polyamides according to the invention, there are advantageously employed the below-mentioned diamines, amino-carboxylic acids and dicarboxylic acids, as well as diamines and amino-carboxylic acids carrying N-substituents as described above by way of example. It is also possible to employ mixtures of two or more compounds of these substance groups, and instead of the amino-carboxylic acids and dicarboxylic acids, there may be utilized their amide-forming derivatives, such as, for example the acid halides.

The preparation of the N-substituted polyamides can be realized according to the usual processes from N-substituted diamines and dicarboxylic acids (or the derivatives thereof, for example acid chlorides) and/or from N-substituted amino-acids (or their derivatives).

Any desired substitution degree may be obtained by co-polycondensation of N-substituted amines and the corresponding unsubstituted amino compounds with dicarboxylic acids (or their derivatives) or of N-substituted amino carboxylic acids with the corresponding unsubstituted aminocarboxylic acids.

Polyamides prepared according to the invention are particularly those which have a melting range in the vicinity of their decomposition temperatures or thereabove and/or which are sparingly soluble or which are not soluble at all in solvents. First of all, they are polyamides obtained from (a) aromatic and/or aromatic-aliphatic diamines and aromatic dicarboxylic acids (optionally with the addition of aminocarboxylic acids), or
(b) aromatic and/or aromatic-aliphatic aminocarboxylic acids, or
(c) aliphatic and/or cyclo-aliphatic diamines and aromatic dicarboxylic acids (optionally with the addition of aminocarboxylic acids), or
(d) aromatic and/or aromatic-aliphatic diamines and aliphatic dicarboxylic acids (optionally with the addition of aminocarboxylic acids), or
(e) cycloaliphatic diamines and cycloaliphatic dicarboxylic acids (optionally with the addition of aminocarboxylic acids). They may also be copolyamides from polyamides indicated sub (a) to (e).

From among the compounds indicated sub (a) to (e) the following substances are mentioned by way of example:

Aromatic diamines having 6 to 20 carbon atoms, for example m- and p-phenylene-diamine, 4,4'-, 3,4'- and 3,3'-diaminodiphenyl and other diaminodiphenyls and diamines of the general formula

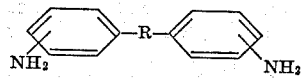

wherein R represents a bivalent radical, such as alkylene, arylene, —O—, —S—, —SO—, —SO$_2$—, —CO—, —CONH—, —R'—O—R'— (R'=identical or different alkylene or arylene radicals), aromatic-aliphatic diamines having 7 to 20 carbon atoms of the general formula $$NH_2—R''—Ar—R''—NH_2$$

wherein R'' represents a single chemical band, or identical or different alkylene groups having 1 to 8 carbon atoms and Ar represents a bivalent aromatic radical which may be substituted such as m- and p-xylylene diamine, 2,5-dimethyl-p-xylylene diamine and 2,4-dimethyl-m-xylylene diamine, aliphatic and cyclo-aliphatic diamines having 2 to 20 carbon atoms, such as compounds of the general formula $$NH_2-(CH_2)_n-NH_2$$

($n$=2 to 10), cis-1,3-, cis-1,4-, trans-1,3-, trans-1,4-, trans-1,2 - bis - aminomethyl-cyclohexanes, trans-12-, cis-1,3-, trans-1,3 - bis-aminomethyl-cyclopentanes and trans-1,2-bis-aminomethyl - cyclo - butane, aromatic dicarboxylic acids having 7 to 20 carbon atoms, such as terephthalic acid, isophthalic acid, 3,5-pyridine-dicarboxylic acid, 1,4- and 1,5-naphthalene-dicarboxylic acid and other naphthalene-dicarboxylic acids, 4,4'-diphenyl-dicarboxylic acid and dicarboxylic acids of the formula

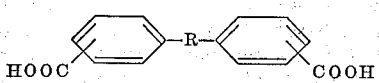

wherein R represents a bivalent radical, such as alkylene, arylene, —O—, —S—, —SO—, —SO$_2$—, —CO—, —CONH—, —R'—O—R'— (R'=identical or different alkylene or arylene radicals), aliphatic and cyclo-aliphatic dicarboxylic acids having 2 to 20 carbon atoms, such as compounds of the general formula $$HOOC-(CH_2)_m-COOH$$

($m$=0 to 10), cis-1,3- and trans-1,3-cyclopentane-dicarboxylic acid, trans-1,2-, cis-1,3-, trans-1,3-, cis-1,4-, trans-1,4-cyclohexane-dicarboxylic acids, 4,4'-dicyclohexyl-dicarboxylic acid, amino-carboxylic acids having 2 to 20 carbon atoms such as compounds of the general formula $$NH_2-(CH_2)_p-COOH$$

($p$=1 to 11), aminopivalic acid, m- and p-aminobenzoic acid, and aminocarboxylic acids of the formula $$NH_2-R'''-Ar-COOH$$

wherein R''' represents a single chemical bond or an alkylene group having 1 to 8 carbon atoms and Ar represents a bivalent aromatic radical which may be substituted.

The N-substituted polyamides are for example prepared by melting stoichiometric or almost stoichiometric amounts of the concerned diamines and dicarboxylic acids, optionally with the addition of N-substituted aminocarboxylic acids or salts from the components or N-substituted aminocarboxylic acids at temperatures of from 200 to 300° C. under the pressure which constitutes itself on account of the elevated temperature and with the exclusion of oxygen, wherupon the melt is maitained at this sion of oxygen, whereupon the melt is maintained at this diminished, then the melt is heated for some time to 200 to 300° C. in an inert gas current, the pressure is then gradually reduced and condensation is continued for some time under reduced pressure at 200 to 300° C.

During the preparation of the N-substituted polyamides, it is necessary to maintain conditions under which the N-substituents will not yet be split-off. It is surprising that polyamides can be prepared at relatively low temperatures (e.g. 230 to 240° C.) and under reduced pressure by means of the condensation in the melt even from strongly sterically hindered diamines (e.g. N,N'-di-tertiary-butyl-diamines) and dicarboxylic acids; i.e., under conditions where the polycondensation in general, is proceeding very slowly.

When the melting point of the salt from the concerned diamine and the dicarboxylic acid, comes near to the temperature at which the N-substituents will already be separated very quickly, it is convenient to adopt the method of the solvent condensation of diamines and dicarboxylic acid halides. In this case, dicarboxylic acid halides or optionally solutions thereof are added to solutions of diamines, optionally in the presence of a hydrogen halide acceptor, for example, of a tertiary amine, at temperatures of from —50° to 100° C.

Appropriate solvents are for example, aprotic solvents such as dimethylformamide, dimethylacetamide, N-methylpyrrolidone or chlorinated hydrocarbons. Interfacial condensation may also be practiced provided that the diamine is sufficiently water-soluble.

Due to their lower melting ranges and/or better solubility in solvents, as compared with the unsubstituted polyamides the N-substituted polyamides can be easily moulded from the melt or from solutions.

In the moulding from solution, solvents such as dimethylformamide, chloroform, acetone and methanol are convenient and their use depends on the solubility of the polyamide. The solutions can be wet or dry spun or cast to yield sheets and foils.

The moulding from the melt, for example, by means of injection moulding, extrusion, or melt-spinning, or from solution does not involve difficulties when temperatures are used at which none of the N-substituents is split off. When the N-substituents are split off during the moulding process, care has to be taken that pressure and temperature conditions are chosen in such a way to make sure that the duration of moulding is identical or even shorter than the time for splitting off the N-substituents. Foaming is impeded by the application of pressure.

The split-off of the N-substitutes occurs thermally at temperatures above 150° C., preferably above 200° C., and below the decomposition temperatures of the final products (polyamides). Splitting-off may also be catalyzed for example with the addition of salts of weak bases with strong acids, for example pyridine hydrochloride. Splitting-off can be effected more or less partially or totally.

By suitable selection of the substituents at the amide nitrogen and appropriate conditions during their splitting-off, the polymer chains are not notably degraded. On selecting, e.g., a linear diamine, such as hexamethylene diamine, for the synthesis of the polyamide chain, branched alkyl groups are introduced as N-substituents, such as the iso-propyl group, the isobutyl group or the tertiary butyl group. In the case of polyamides from aromatic diamines, such as m-phenylene diamine or from aromatic-aliphatic diamines, such as xylylene diamines or from branched diamines, for example, of the neopentyl type

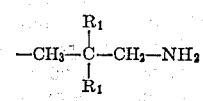

($R_1$=identical or different, monovalent, aliphatic, cycloaliphatic or aromatic radicals), normal alkyl groups may also be employed as substituents.

The conditions for splitting-off the substituents are dependent on the nature of the substituents and on the polyamide as well as on the shape the final product has to present.

Branched alkyl groups can be split-off in the easiest way, whereas n-alkyl groups need more rigorous conditions. While the tertiary butyl group can be split-off at temperatures of from 200 to 300° C., the isopropyl or isobutyl group require temperatures above 30° C., and for splitting-off the n-alkyl groups temperatures above 350° C. are needed.

For the production of fibers and sheets (foils), corresponding shaped articles from N-substituted polyamides are slowly heated, beginning with the minimum temperatures necessary for splitting-off. Shaped articles of higher wall thickness can be produced by slowly heating the polyamides of the invention in the mold. In this case, the heating speed is inferior to that used in the manufacture of sheets. The splitting-off of the N-substituents can also be realized under pressure, with pressure release preferably after cooling.

The finished product (polyamide) shows a higher melting range, a higher second order transition temperature or lower solubility, or it exhibits these properties at the same time. When the N-substituents are split-off totally, the finished product exhibits the properties of the unsubstituted polyamide.

The following examples illustrate the invention.

EXAMPLES

All reduced specific viscosities have been determined on solutions of 1 g. of polyamide in 100 ml. of phenol/tetrachlorethane (in a weight ratio of 60:40) at 25° C.

(1a) Condensation of N,N'-di-tertiary-butyl-p-xylylene diamine with isophthaloyl chloride.—4.968 g. of N,N'-di-tertiary-butyl-p-xylylene diamine and 4.2 g. of triethylamine were reacted at 20° C. in 50 ml. of dimethylformamide with 4.061 g. of isophthaloyl chloride. The reaction mixture was poured into water. Then the polyamide was suction-filtered, washed until it was free of chloride and dried.

The polyamide showed a reduced specific viscosity of 1.03 dl/g. and was soluble in solvents such as chloroform, acetone, dimethylformamide, and dimethylacetamide.

(b) Splitting-off isobutylene from the polyamide.—A sample of the polyamide according to Example (1a), was dissolved in acetone and cast to yield a sheet. This sheet was heated to 240° C. and the temperature was slowly increased to 300° C. (at a speed of 20° C. per hour). Thus a sheet was obtained which was not soluble in solvents.

(2a) Condensation of N,N'-di-tertiary-butyl-p-xylylene diamine with adipic acid.—In order to obtain the salt, solutions of 24.842 g. of N,N'-di-tertiary-butyl-p-xylylene diamine and of 14.615 g. of adipic acid respectively in methanol were poured together. The precipitated salt was suction-filtered, dissolved in water, precipitated with acetone, suction-filtered and dried.

The salt was then melted in a flask at 240° C. under nitrogen and it was maintained at this temperature during 2 hours in a nitrogen current. Then it was evacuated slowly to a pressure of 0.05 torr and condensation was continued during 4 hours at a temperature of from 230 to 240° C. The polyamide obtained exhibited a reduced specific viscosity of 1.2 dl./g. and was soluble in solvents such as chloroform and dimethyl formamide.

(b) Splitting-off isobutylene from the polyamide.—A sample of the polyamide according to Example (2a) was dissolved in chloroform and cast to yield a sheet. This sheet was heated to 240° C. and the temperature was increased to 300° C. within 2 hours Thus a sheet was obtained which changed its color above 350° C. and which was insoluble in solvents such as dimethyl-formamide or phenol-tetrachlorethane.

Another sample of the polyamide according to Example (2a), was melted in a glass tube under nitrogen at 200° C., then heated to 240° C. and finally heated to 30° C. within 6 hours. A compact polyamide was obtained.

(3a) Condensation of N,N'-di-isopropyl-hexamethylene diamine with terephthalic acid.—In order to obtain the salt, 20.037 g. of N,N'-di-isopropyl-hexamethylene diamine and 16.614 g. of terephthalic acid were boiled in 250 ml. of ethanol for 1 hour. After elimination of the solvent, the salt was dissolved in water and precipitated with iso-propanol.

The dried salt was polycondensed in a glass flask at 280° C., under nitrogen as described in Example (2a). The polyamide obtained showed a reduced specific viscosity of 1.6 dl/g. and was soluble in solvents, such as methanol and dimethyl formamide.

(b) Splitting-off propylene from the polyamide.—A sample of the polyamide according to Example (3a) was dissolved in methanol and cast to yield a sheet. This sheet was heated to 340° C. and the temperature was increased to 360° C. within 2 hours. A sheet was obtained which was no longer soluble in phenol-tetrachlorethane.

(4a) Condensation of N,N'-di-isobutyl-hexamethylene diamine with terephthalic acid.—In order to obtain the salt, 22.842 g. of N,N'-di-isobutylhexamethylene diamine and 16.614 g. of terephthalic acid were dissolved in ethanol. The salt was precipitated by means of the addition of isopropanol to the hot solution and then dried.

The salt was polycondensed, at 260° C. in a glass flask, as described in Example (2a). The polyamide showed a reduced specific viscosity of 1.3 dl./g. and was soluble in solvents like dimethyl formamide, N-methylpyrrolidone and chloroform.

(b) Splitting-off isobutylene from the polyamide.—A sample of the polyamide according to Example (4a) was melted at 300° C. in a glass tube under nitrogen and heated to 360° C. Within 1 hour, the temperature was increased to 375° C. Thus, a compact polyamide was obtained which exhibited a reduced specific viscosity of 1.4 dl./g.

(5a) Condensation of N,N'-di-isobutyl-m-phenylene diamine with isophthaloyl chloride.—22.036 g. of N,N'-isobutyl-m-phenylene diamine and 20.5 g. of triethyl amine were reacted at 0° C. in 200 ml. of dimethyl formamide with 20.303 g. of isophthaloyl chloride. Then, the reaction mixture was poured into water and the polyamide was suction-filtered, washed until it was free of chloride and then dried. It showed a reduced specific viscosity of 1.3 dl./g. and was soluble in solvents such as dimethyl formamide and dimethylacetamide.

(b) Splitting-off isobutylene from the polyamide.—A sample of the polyamide according to Example (5a) was melted in a glass tube under nitrogen and heated to 350° C. Within 3 hours, the temperature was increased to 380° C. Thus, a compact polyamide was obtained which was no longer soluble in solvents.

What is claimed is:

1. In a process for producing shaped articles from polyamides of the type that normally have melting ranges near to or above their decomposition temperatures and have little or no solubility in solvents, the improvement which comprises forming said polyamide from diamines or amino carboxylic acids in which at least 10% of the amine groups are N-substituted by aliphatic or aromatic aliphatic hydrocarbon groups to reduce the melting point of the amide, and molding the resulting polyamide by melting it at a temperature below that which would cause decomposition of the polyamide or from a solution with subsequent heating to an elevated temperature, said temperature being sufficient to split off at least a part of the aliphatic or aromatic aliphatic N-substituents of the polyamide.

2. A process according to claim 1 and wherein from 50% to 100% of the amine groups of the polyamide are N-substituted by aliphatic or aromatic aliphatic groups.

3. Process according to claim 1, which comprises molding polyamides wherein the substituents at the amide nitrogen are alkyl groups having 2 to 12 carbon atoms.

4. Process according to claim 1, which comprises molding polyamides wherein the substituents at the amide nitrogen are alkyl groups having 2 to 8 carbon atoms.

5. Process according to claim 1, which comprises molding polyamides, wherein n-propyl, i-propyl-, i-butyl or tertiary butyl groups are employed as substituents at the amide nitrogen.

6. Process according to claim 1, which comprises molding polyamides, wherein a mixture of two or more different substituents at the amide nitrogen is employed.

References Cited

UNITED STATES PATENTS

| 3,340,325 | 9/1967 | Suffredini | 264—126 |
| 3,551,548 | 12/1970 | Brignac et al. | 264—234 |
| 3,600,361 | 8/1971 | Heacock et al. | 264—234 |

ROBERT F. WHITE, Primary Examiner

G. AUVILLE, Assistant Examiner

U.S. Cl. X.R.

260—78 SC; 264—234